(12) United States Patent
Alwakeel et al.

(10) Patent No.: US 8,661,484 B1
(45) Date of Patent: Feb. 25, 2014

(54) DYNAMIC PROBABILITY-BASED ADMISSION CONTROL SCHEME FOR DISTRIBUTED VIDEO ON DEMAND SYSTEM

(75) Inventors: Sami Saleh Alwakeel, Riyadh (SA); Hesham Abdulaziz Altwaijry, Riyadh (SA); Muhammad Ammad Ud Din, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 13/587,881

(22) Filed: Aug. 16, 2012

(51) Int. Cl.
*H04N 7/173* (2011.01)
*H04N 21/24* (2011.01)
*H04N 21/472* (2011.01)
*H04N 21/239* (2011.01)

(52) U.S. Cl.
CPC ....... *H04N 21/2408* (2013.01); *H04N 7/17318* (2013.01); *H04N 21/47202* (2013.01); *H04N 21/2393* (2013.01)
USPC ............... 725/95; 725/86; 725/87; 725/96; 725/97; 725/138; 370/232; 370/252; 370/253; 370/329; 370/463

(58) Field of Classification Search
USPC ................................................... 725/95
See application file for complete search history.

(56) References Cited

U.S. PATENT DOCUMENTS

| | | | |
|---|---|---|---|
| 5,691,975 A | | 11/1997 | Hamada et al. |
| 6,175,378 B1 * | | 1/2001 | Maillard ...................... 725/105 |
| 6,567,415 B1 | | 5/2003 | Elwalid et al. |
| 7,739,712 B2 * | | 6/2010 | Boyden et al. .................. 725/81 |
| 7,747,982 B1 * | | 6/2010 | Sie et al. ........................ 717/118 |
| 7,774,468 B1 | | 8/2010 | Nag et al. |
| 8,375,414 B2 * | | 2/2013 | Covey ............................. 725/95 |
| 8,423,660 B2 * | | 4/2013 | Leung et al. .................. 709/231 |
| 8,451,804 B2 * | | 5/2013 | Vujcic ............................ 370/336 |
| 8,542,642 B2 * | | 9/2013 | Lin et al. ........................ 370/329 |
| 2005/0002405 A1 * | | 1/2005 | Gao ............................... 370/401 |
| 2005/0071882 A1 * | | 3/2005 | Rodriguez et al. ............. 725/95 |
| 2009/0183213 A1 * | | 7/2009 | Mukerji et al. ................. 725/95 |
| 2012/0131622 A1 * | | 5/2012 | Mcdysan et al. ............... 725/95 |
| 2012/0185899 A1 * | | 7/2012 | Riedl et al. ..................... 725/35 |
| 2012/0233644 A1 * | | 9/2012 | Rao ................................. 725/62 |

FOREIGN PATENT DOCUMENTS

WO   WO 2008002298   1/2008

OTHER PUBLICATIONS

Kalva et al, "Techniques for improving the capacity of video on demand systems", IEEE, pp. 308-315, 1996.*
Waldvogel et al, "Efficient media on demand over multiple multicast groups", IEEE, pp. 1662-1666, 2001.*
Evans et al., "Optimally Scheduling Video-on-Demand to Minimize Delay When Sender and Receiver Bandwidth May Differ", 2006, ACM, pp. 661-678.*

* cited by examiner

*Primary Examiner* — Nasser Goodarzi
*Assistant Examiner* — Michael B Pierorazio
(74) *Attorney, Agent, or Firm* — Richard C. Litman (57) ABSTRACT

The dynamic probability admission control policy for distributed video provides a method that decides in a Video on Demand (VOD) system which content requests can be admitted and which requests should be rejected to maintain Quality of Service (QoS). Requests for popular and expensive movies should not be rejected on the behalf of unpopular movies to generate more revenue. The dynamic probability admission control policy combines a shared resource admission control and a class-based admission control. Moreover, dynamic probability is used to access shared resources, such as ports and bandwidth. A nonlinear dynamic probability function is used for allocation of ports/bandwidth. The dynamic probability admission control policy improves performance of all the request classes, as well as overall system performance.

7 Claims, 12 Drawing Sheets

DYNAMIC PROBABILITY-BASED ADMISSION CONTROL SCHEME FOR DISTRIBUTED VIDEO ON DEMAND SYSTEM

BACKGROUND OF THE INVENTION

1. Field of the Invention

The present invention relates to the allocation of resources in cellular and wireless networks, and particularly to a dynamic probability-based admission control scheme for a distributed video on demand system that manages and distributes system resources more efficiently and that may generate more revenue.

2. Description of the Related Art

Video on Demand (VOD) is a system that allows users to select and watch a video on demand. A number of user requests arrive per second for different categories (popular and unpopular) of videos. An admission control policy decides which request can be admitted and which request should be rejected in order to maintain Quality of Service (QoS) requirements. Traditional admission control systems use either threshold or resource capacity to accept or reject any incoming requests.

Admission control is a key component for QoS delivery in VOD systems because it determines which request is accepted and which is not, and also how network resources are utilized. Admission control in Video on Demand has become an important area of interest for most network researchers for the provisioning of end-to-end Quality of Service (QoS).

In cellular and wireless networks, Dynamic Admission control is very important for the allocation and management of bandwidth for different types of call (New or Handover) and for different class of service (voice, video and data). Current static admission control methods cannot cope with dynamic changes of input traffic and network topology.

Thus, a dynamic probability based admission control scheme for distributed video on demand system solving the aforementioned problems is desired.

SUMMARY OF THE INVENTION

The dynamic probability based admission control scheme for distributed video on demand system provides a method that decides, in a Video on Demand (VOD) system, which content requests can be admitted and which requests should be rejected to maintain QoS. Requests for popular and expensive movies should not be rejected on behalf of unpopular movies to generate more revenue.

Traditional admission control systems use either threshold or resource capacity to accept or reject any incoming requests. In contrast, the present dynamic probability admission control policy combines a shared resource admission control and a class-based admission control. Moreover, dynamic probability is used to access shared resources, such as ports and bandwidth. A non-linear dynamic probability function is used for allocation of ports/bandwidth. The present dynamic probability admission control policy improves performance of all the request classes, as well as overall system performance.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The dynamic probability based admission control scheme for distributed video on demand system provides a method that decides, in a Video on Demand (VOD) system, which content requests can be admitted and which requests should be rejected to maintain Quality of Service (QoS). Requests for popular and expensive movies should not be rejected on behalf of unpopular movies in order to generate more revenue.

Traditional admission control systems use either threshold or resource capacity to accept or reject any incoming requests. In contrast, the present dynamic probability admission control policy combines a shared resource admission control and a class-based admission control. Moreover, dynamic probability is used to access shared resources, such as ports and bandwidth. A non-linear dynamic probability function is used for allocation of ports/bandwidth. The present dynamic probability admission control policy improves performance of all the request classes, as well as overall system performance.

The dynamic probability based admission control policy (DPAC) provides means for efficiently managing requests so that a maximum number of requests are admitted in order to maximize revenue.

The DPAC policy also provides means for using most of the resources all of the time, while reserving capacity to admit the request of most popular programs. This feature is provided because the popular class request typically generates more revenue as compared to a less popular class of content. The probability of a request to be admitted or rejected is dynamic, depending upon the class of request, the arrival rate of that class, the availability of resources, and the server workload.

It will be understood that the diagrams in the Figures depicting the dynamic probability based admission control scheme for distributed video on demand system are exemplary only, and may be embodied in a dedicated electronic device having a microprocessor, microcontroller, digital signal processor, application specific integrated circuit, field programmable gate array, any combination of the aforementioned devices, or other device that combines the functionality of the dynamic probability based admission control scheme for distributed video on demand system onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the system and steps of the method described herein.

Figure 1A:
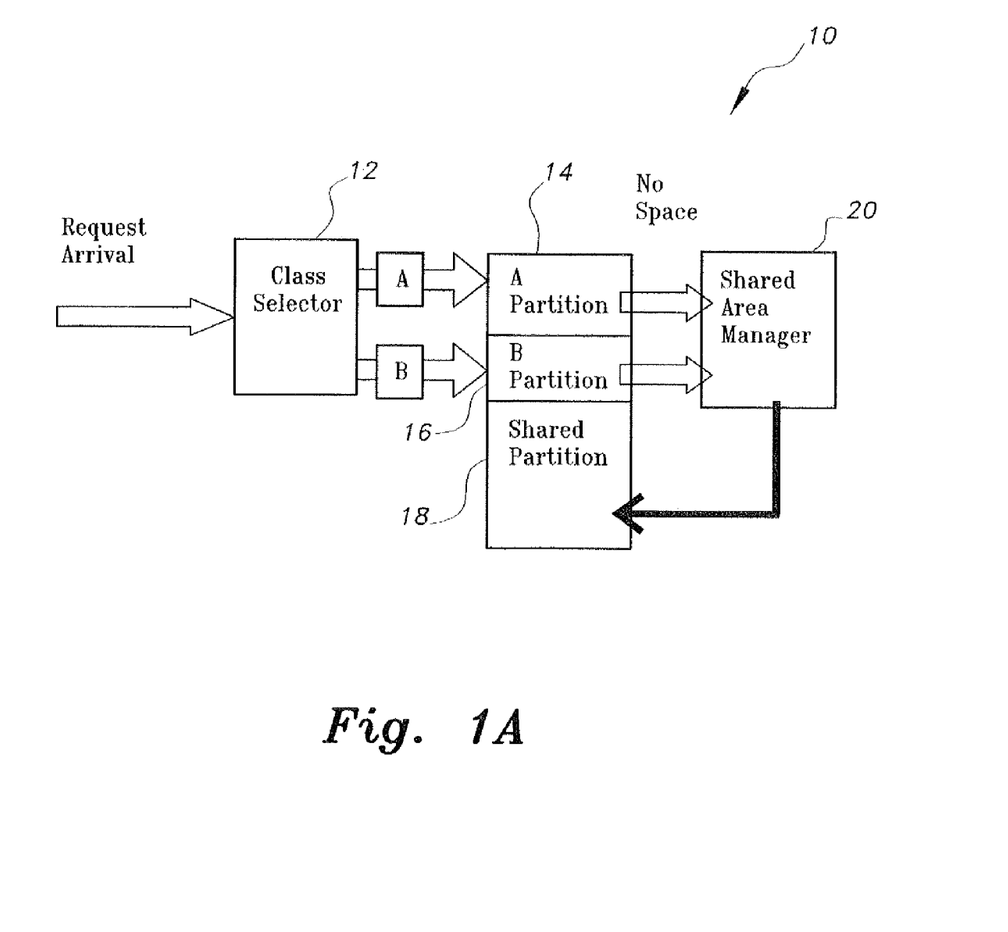
FIG. 1A is a block diagram showing the overall architecture of a system for implementing a dynamic probability admission control (DPAC) policy for video on demand according to the present invention.

In the DPAC system 10, the total capacity of VOD server (ports) is partitioned into a number of partitions equal to the number of classes, plus a shared area. As shown in FIG. 1A, the exemplary system 10 has a class selector 12 that accepts requests, classifies the requests, and forwards the classes into a partitioner comprising a first partition 14, a second partition 16, and a third, shared partition 18. The A and B partitions 14 and 16 forward their respective requests to a shared area manager 20, which feeds back to the shared partition 18.

Figure 1B:
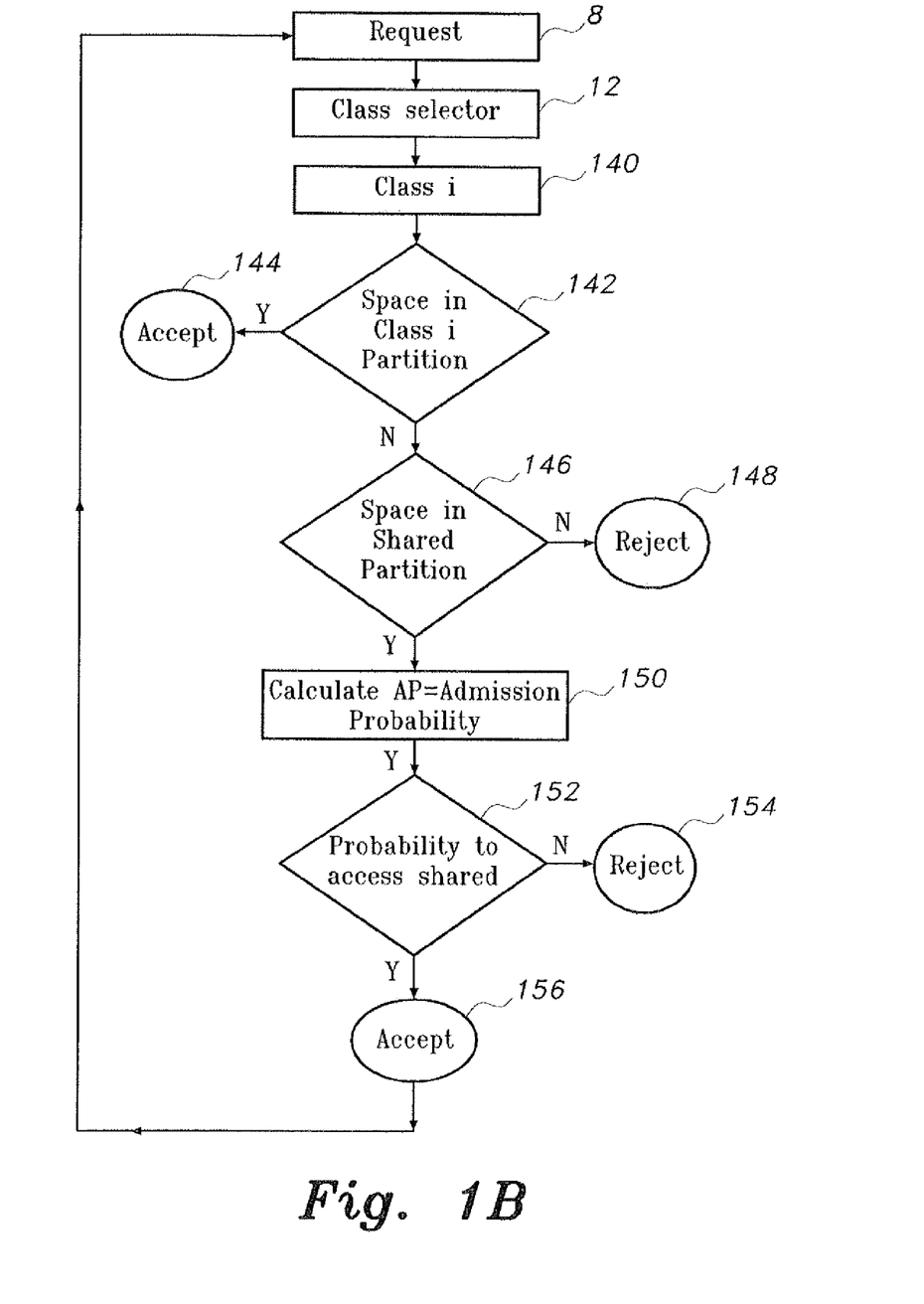
FIG. 1B is a flowchart showing an algorithm implemented on the DPAC system of FIG. 1.

When a request arrives, the class selector 12 decides which class the request belongs to, then the class selector 12 sends the request to its corresponding partition, either 14 or 16, depending on whether the class was A or B. The request is admitted if there is capacity in its corresponding partition. If there is no space in the corresponding partition, the request is not rejected outright, but sent to the shared area manager 20 (SAM). Within the SAM 20, a dynamic probability of the request to access the shared area is calculated. If the shared area has capacity and the request has probability, then the request is accepted and resources are allocated from the shared partition 18. The algorithm is shown in FIG. 1B, wherein a request 8 goes through class selector 12, which, at step 140, partitions the classes and, at step 142, decides whether there is space in the class partition (class A partition 14 or class B partition 16) being analyzed. The request is accepted at step 144 if there is space. If there is no space, a check is performed at step 146 to determine whether there is space in the shared partition 18. If not, the request is rejected 148, otherwise the dynamic probability is calculated at step 150. If there is probability to access the shared partition 18, then the request is accepted at step 156, otherwise the request is rejected at step 154.

More generally, in the DPAC system 10, the VOD server capacity is partitioned as C1, C2, . . . CN, +CS, where C is a request class, N is a total priority of classes, and CS is a shared Area. Requests arrive with rate of $\lambda 1, \lambda 2, \ldots, \lambda v$. The class selector 12 decides which class the request belongs to. Then the system 10 admits the incoming request if there is capacity in its required class (class A or class B). If there is no capacity in the particular class, then the request is handed over to the shared area manager (SAM) 20, which admits the request in the shared area with a dynamic probability (Pi). If there is no probability or no capacity in the shared area 18, then the request is rejected. The probability of acceptance of any request in the shared area 18 is dynamic, depending upon the remaining server capacity and the total arrival of that class so for. The dynamic probability of any class will not go above 100%, and will not go below its minimum level. The minimum level for each class is dynamic, depending upon the percentage (%) of arrival of that class.

In the present dynamic probability admission control policy system 10, the dynamic probability is a nonlinear function characterized by the relation:

$$Pi = 100 - \left(\frac{sharedbusyports\% * \text{Arrival } j\%}{100}\right). \qquad (1)$$

If there is probability, then the request is accepted.

Figure 2A:
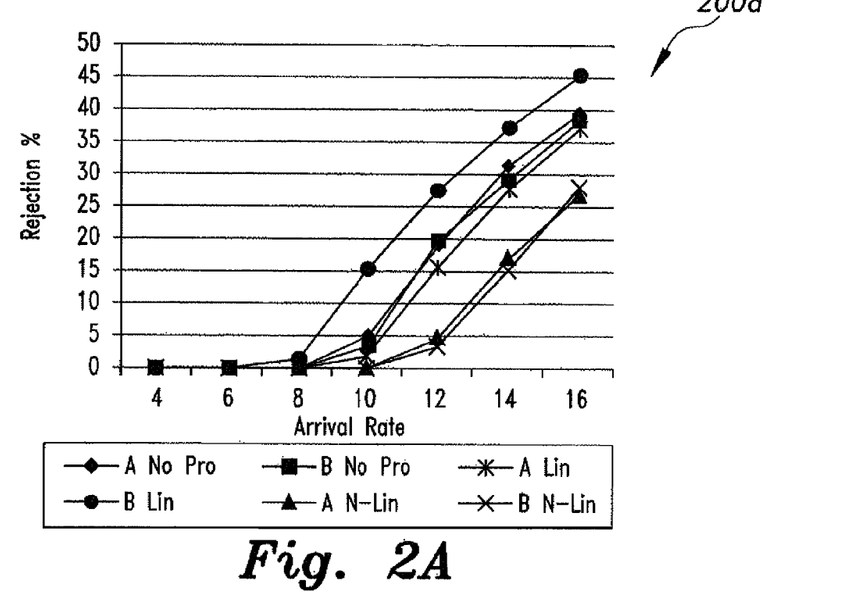
FIG. 2A is a chart showing the rejection rate of both the classes A and B for all systems (present scheme Non-Linear probability (N-Lin), Linear Probability (Lin) and without probability (No Pro)).
Figure 2B:
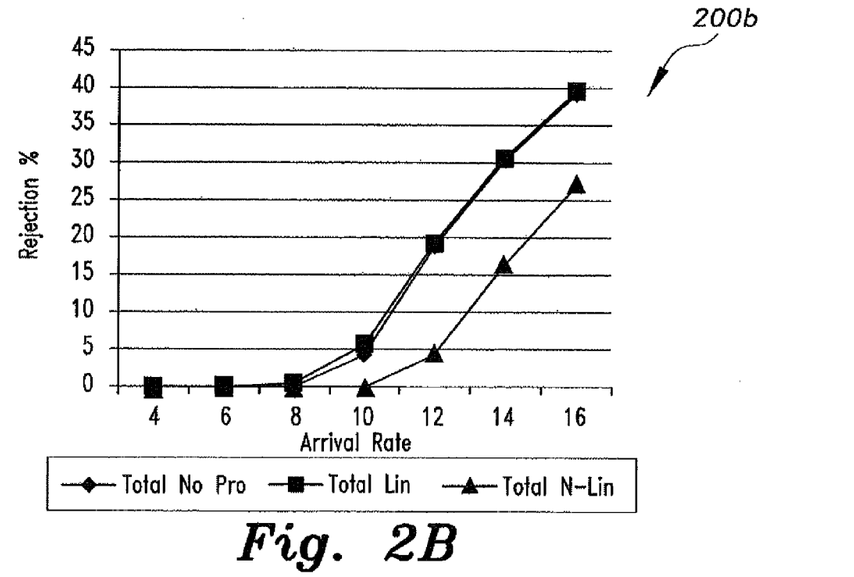
FIG. 2B is a chart showing the comparison of total blocking % of each system (present scheme N-Lin, Lin and No Pro).
Figure 2C:
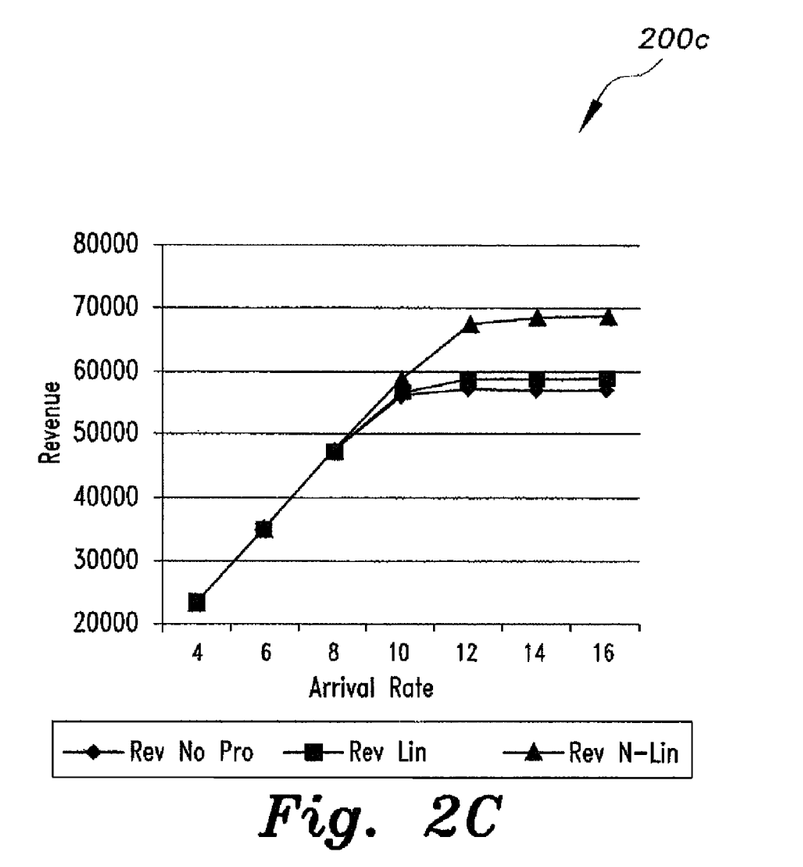
FIG. 2C is a chart showing the comparison of revenue generated of each system (present scheme N-Lin, Lin and No Pro).

Results taken by using the nonlinear probability function (N-Lin), equation (1), have been compared with linear probability function (Lin) and without probability (No-Pro). The result suggests that the rejection percentage of both the classes are substantially reduced in the DPAS system 10. The nonlinear DPAC plots 200a, 200b, 200c are shown in FIGS. 2A, 2B and 2 C, respectively. The system was tested against increasing load of incoming requests. 70% of these incoming requests were belongs to popular movies, and the rest of them were for unpopular. The duration of requested movies was not fixed. It was random (90 minutes to 120 minutes) to make it more realistic. In real life, a person can request a movie of any duration. All other input parameters were constant. Input parameters included Class A partition size of 25%, Class B 25% Shared 50%, movie time random (90 min to 120 min), arrival rate in request per minute were 4, 6, 8 - - - 16, where the Class A contribution ($\lambda$A) was 70% and the class B ($\lambda$B) was 30%. Total simulation time was 24 hours. FIG. 2A shows the percentage of rejected requests of both the classes, popular and unpopular (A and B), and it is shown that the total rejection of both the classes reduced a lot. FIG. 2B illustrate that the overall rejection of our proposed system is better then all others, and about 10% improvement is observed for nonlinear admission control system 10. FIG. 2C shows a comparison of revenue generated, and it's observed that 12% more revenue can be generated in the proposed system 10.

Figure 3A:
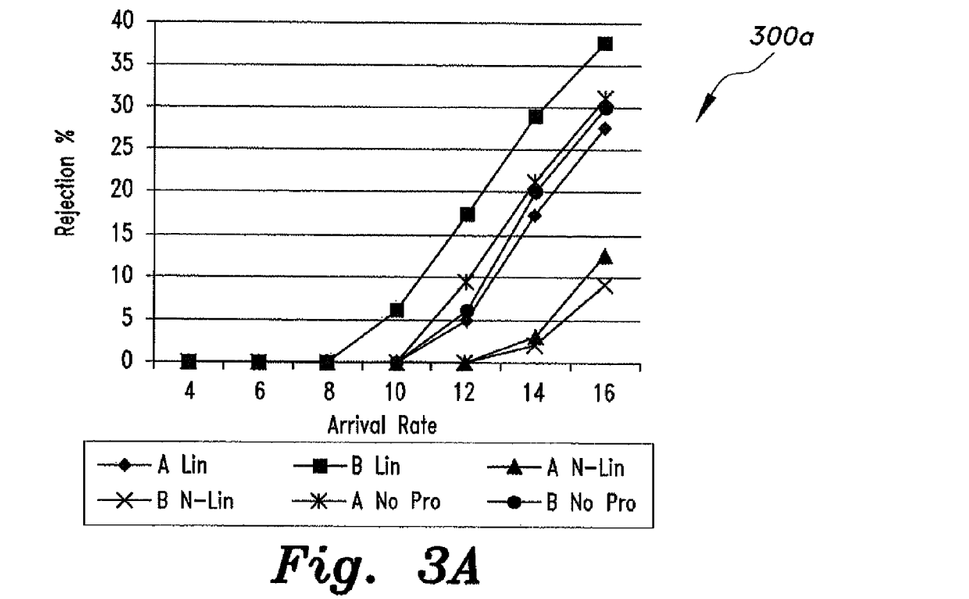
FIG. 3A is a chart showing the rejection rate of both the classes A and B for 1st alternative parameter for all systems (present scheme Non-Linear probability (N-Lin), Linear Probability (Lin) and without probability (No Pro)).
Figure 3B:
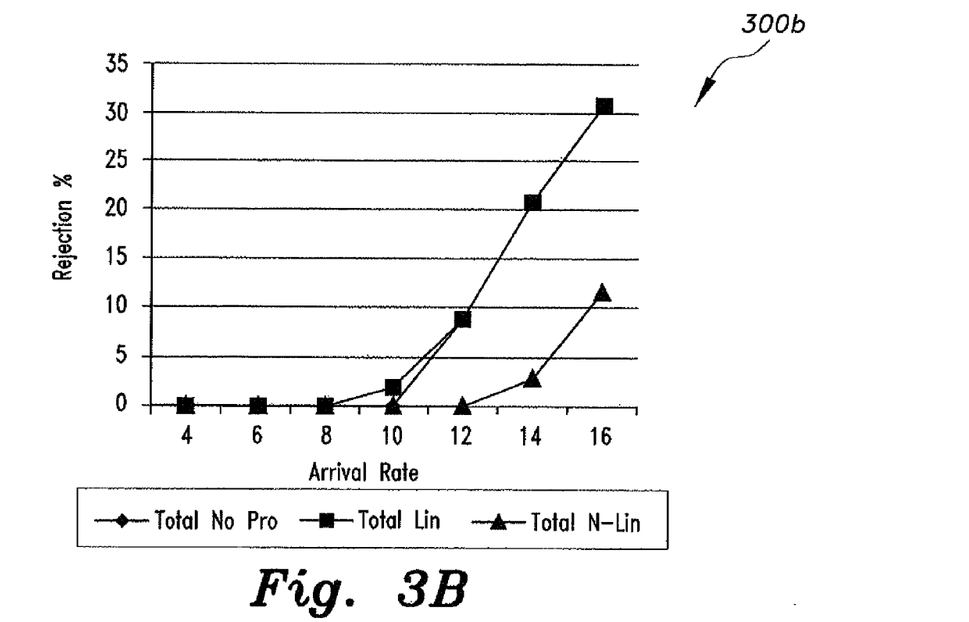
FIG. 3B is a chart showing the comparison of total blocking % for 1st alternative parameter for all the systems (present scheme N-Lin, Lin and No Pro).
Figure 3C:
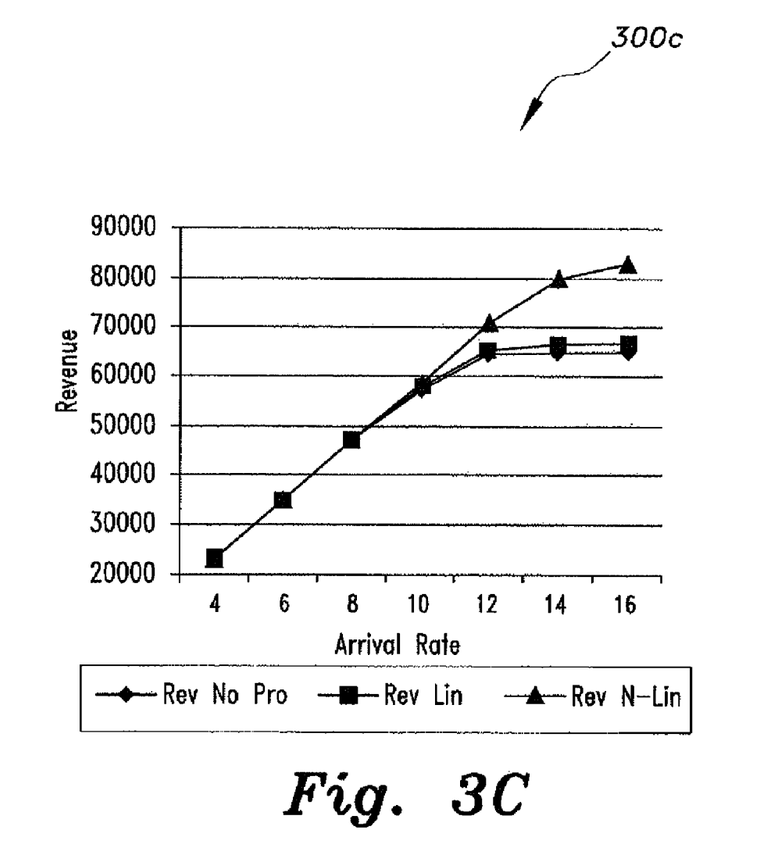
FIG. 3C is a chart showing the comparison of revenue generated for 1st alternative parameter in each system (present scheme N-Lin, Lin and No Pro).

FIGS. 3A, 3B, and 3C are the same as FIGS. 2A, 2B, and 2C, with the only difference being a fixed movie time of 90 minutes. The proposed system was tested against an increasing load of incoming requests while keeping the movie time constant for all (90 minutes).

Figure 4A:
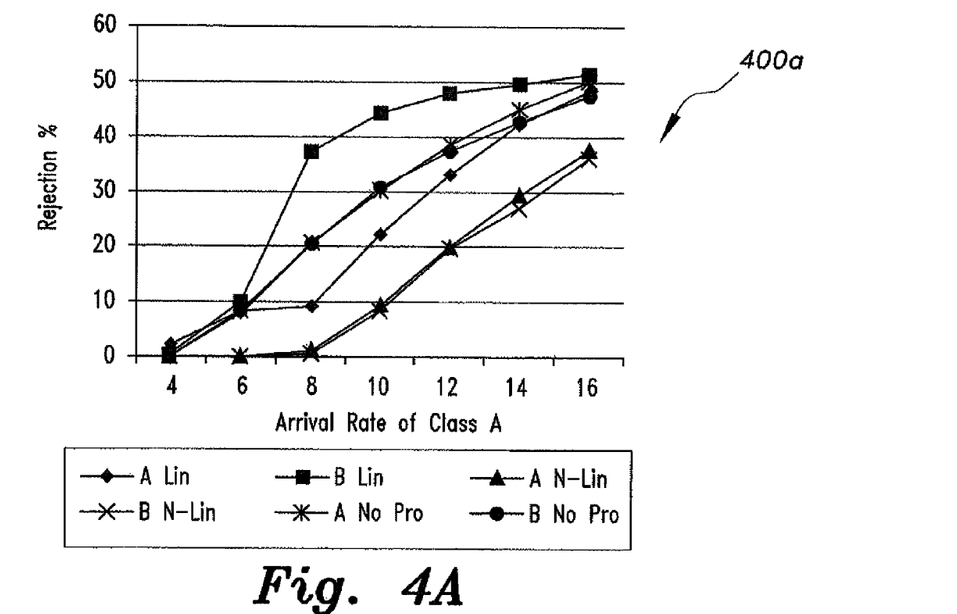
FIG. 4A is a chart showing the rejection % of both the classes A and B for 2nd alternative parameter for all systems (present scheme Non-Linear probability (N-Lin), Linear Probability (Lin) and without probability (No Pro)).
Figure 4B:
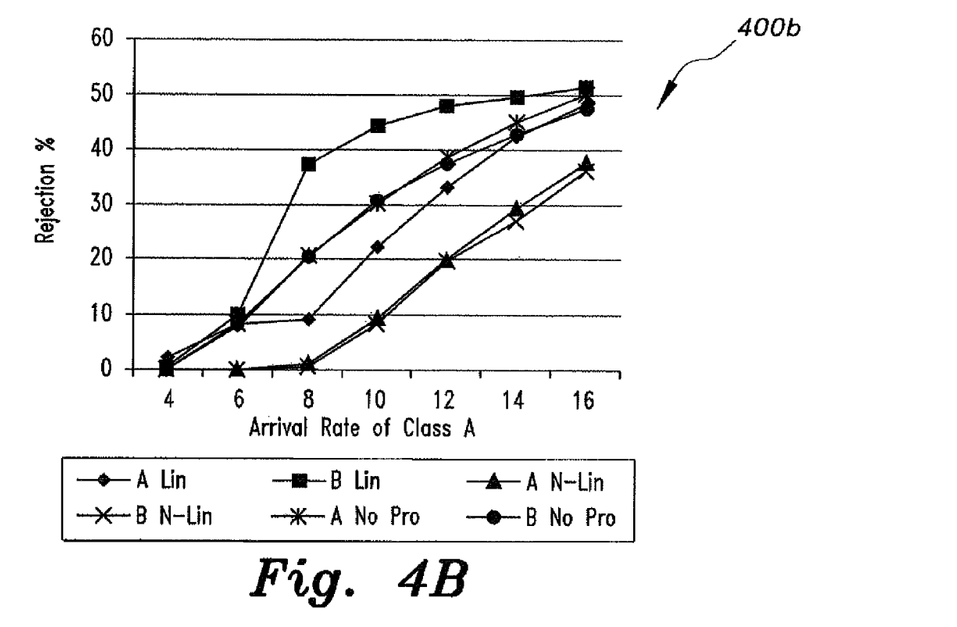
FIG. 4B is a chart showing the comparison of total blocking % for 2nd alternative parameter for all the systems (present scheme N-Lin, Lin and No Pro).
Figure 4C:
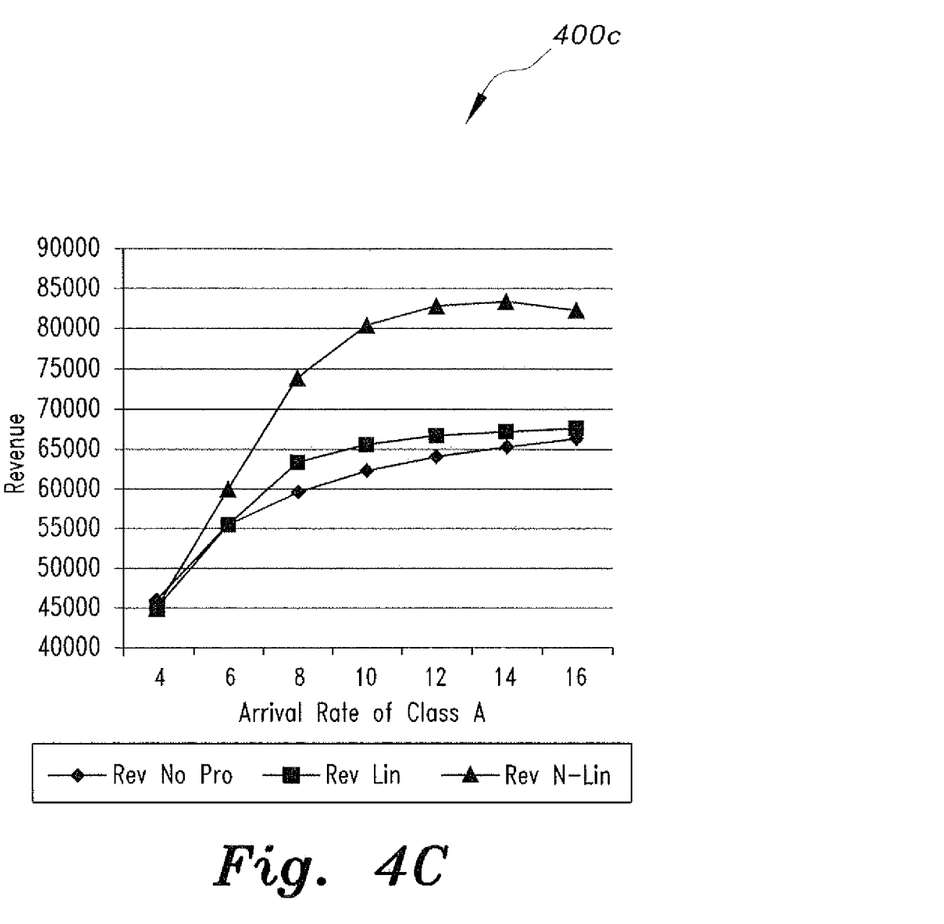
FIG. 4C is a chart showing the comparison of revenue generated for 2nd alternative parameter in each system (present scheme N-Lin, Lin and No Pro).

FIGS. 4A, 4B, and 4C show the results with variable Arrival Rate of class A. The proposed system is tested against increasing load of popular movie class requests while all other parameters are kept constant.

Figure 5A:
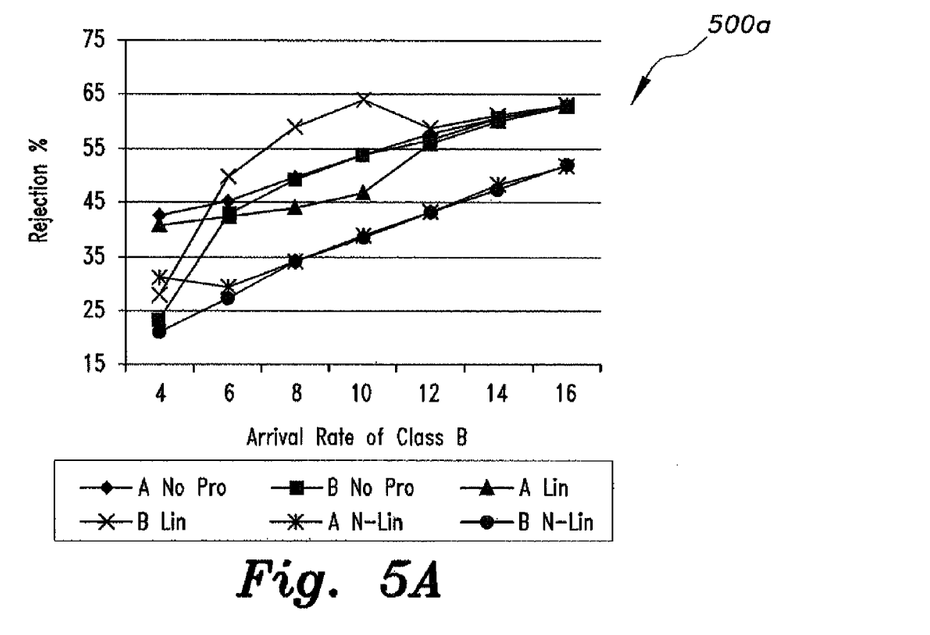
FIG. 5A is a chart showing the rejection rate of both the classes A and B for 3rd alternative parameter for all systems (present scheme Non-Linear probability (N-Lin), Linear Probability (Lin) and without probability (No Pr)).
Figure 5B:
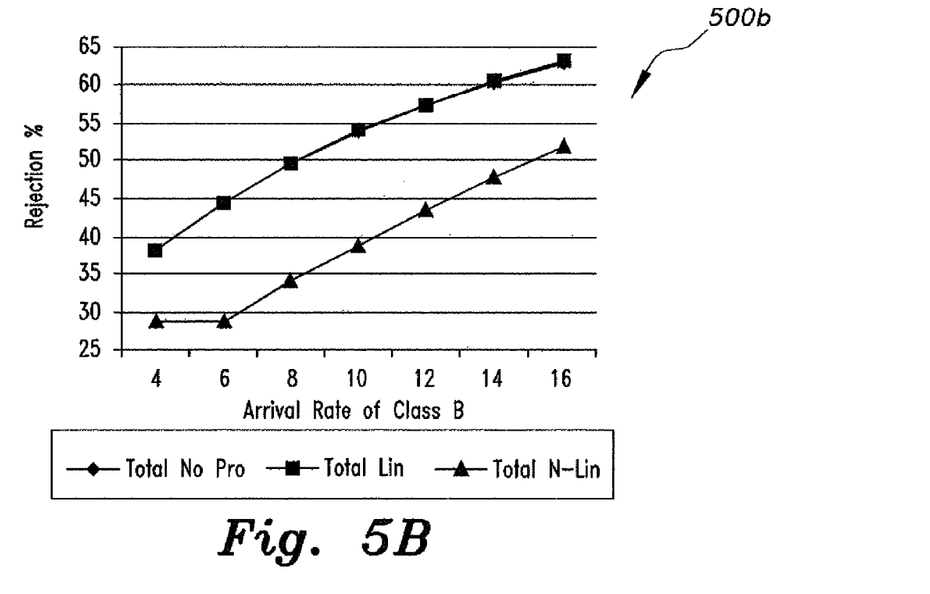
FIG. 5B is a chart showing the comparison of total blocking % for 3rd alternative parameter for all the systems (present scheme N-Lin, Lin and No Pro).
Figure 5C:
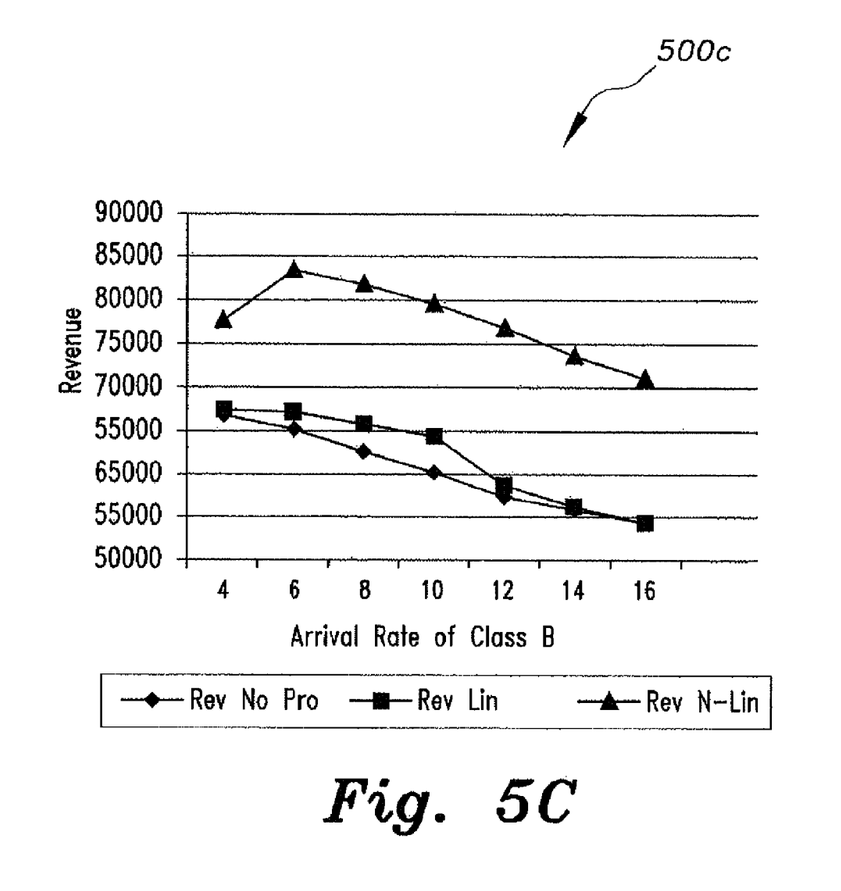
FIG. 5C is a chart showing the comparison of revenue generated for 3rd alternative parameter in each system (present scheme N-Lin, Lin and No Pro).

FIGS. 5A, 5B, and 5C show the results taken by varying the Arrival Rate of class B. The proposed system was tested against an increasing load of unpopular movie class requests while all other parameters are kept constant.

Figure 6A:
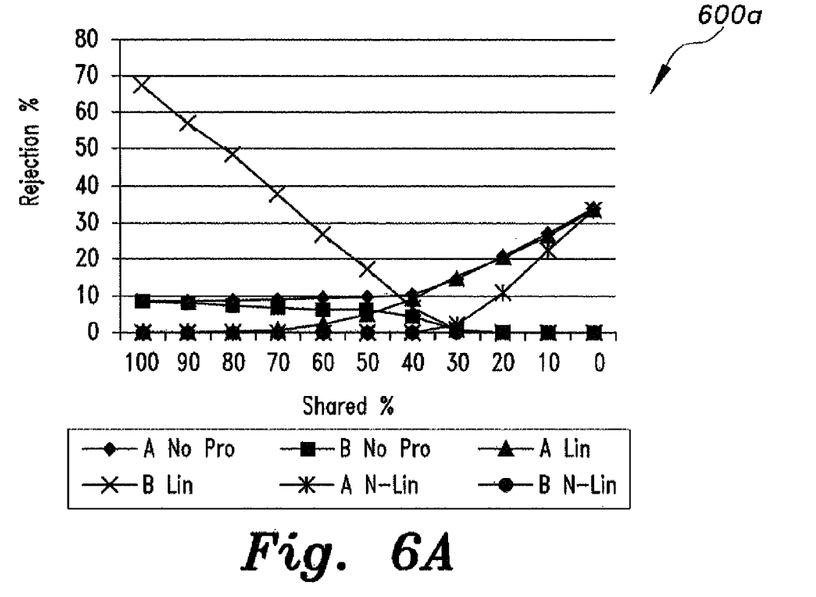
FIG. 6A is a chart showing the rejection rate of both the classes A and B for 4th alternative parameter for all systems (present scheme Non-Linear probability (N-Lin), Linear Probability (Lin) and without probability (No Pro)).
Figure 6B:
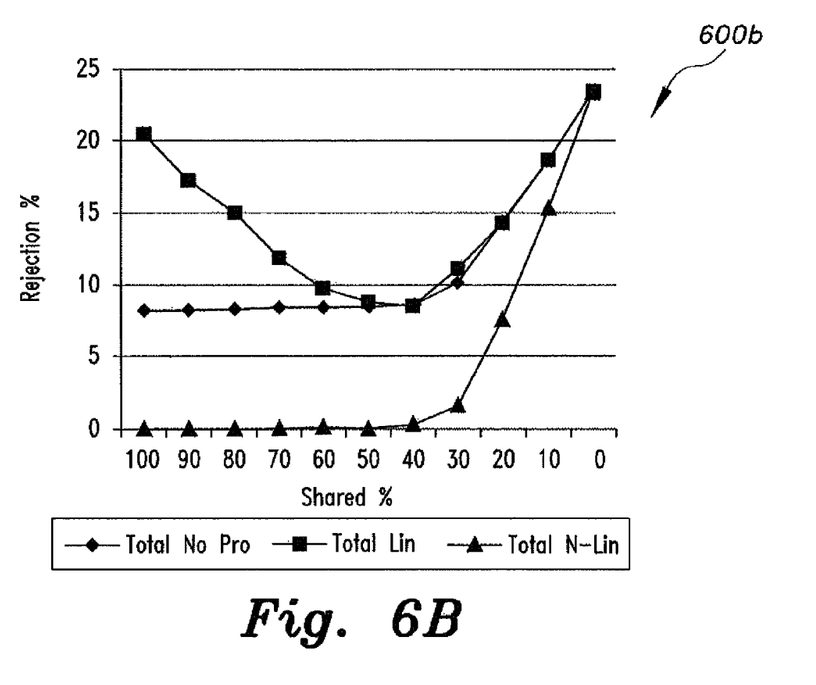
FIG. 6B is a chart showing the comparison of total blocking % for 4th alternative parameter for all the systems (present scheme N-Lin, Lin and No Pro).
Figure 6C:
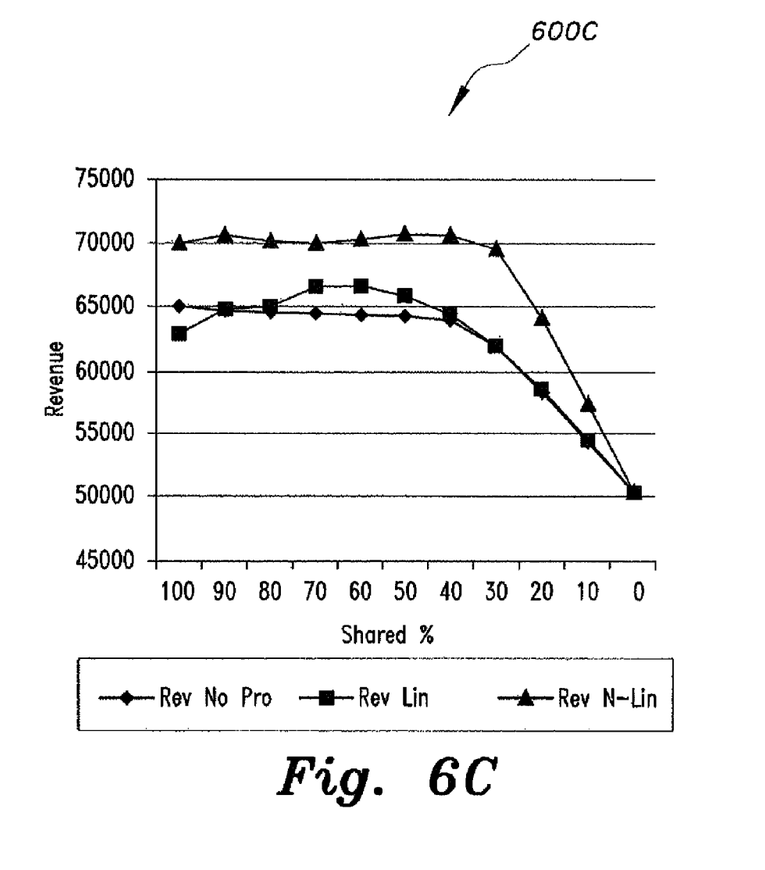
FIG. 6C is a chart showing the comparison of revenue generated for 4th alternative parameter in each system (present scheme N-Lin, Lin and No Pro).

FIGS. 6A, 6B, and 6C show the results taken by varying Partition size. The proposed system was tested against an increasing size of shared partitions allocated in DAPS system, while all other parameters are kept constant.

In the present DPAC system 10, a novel (DPAC) Dynamic Probability-based Admission Control policy for VOD system has been designed and developed for improvement in QoS of VOD system. The Dynamic Admission Control policy distributes the server resources fairly among the different classes of incoming requests popular and expensive class request will always have priority over unpopular and cheaper class request to generate more revenue. Results show that the present dynamic admission control policy system 10 is the best choice for the allocation of server resources (ports, bandwidth) among different class of traffic in Video on Demand such that maximum revenue can be generated. The DPAC system 10 not only improves rejection percentage of the high priority class, but also improves the rejection of other classes and rejection of the overall system. Finally by using this system the overall revenue will increase significantly.

It is to be understood that the present invention is not limited to the embodiments described above, but encompasses any and all embodiments within the scope of the following claims.

We claim:

1. A computer-implemented method for dynamic probability based admission control scheme for distributed video on demand system in a network, comprising the steps of:
accepting incoming video on demand requests as they arrive for classification thereof;
classifying the video on demand requests into at least first and second class video on demand requests;
wherein the first class requests are designated high priority, the second class requests are designated low priority;
partitioning system resources into a number of partitions equal to the number of classes of video on demand requests plus a shared partition;
allocating the first class video on demand requests to the first class partition if the first class partition is not full;
allocating the second class video on demand requests to the second class partition if the second class partition is not full;
allocating new first class video on demand requests to the shared partition when the first class video on demand partition is full if based upon a dynamically computed probability subsequent incoming requests being filled by the shared partition;
allocating new second class video on demand requests to the shared partition when the second class video on demand partition is full based on a dynamically computed probability of the new requests being filled by the shared partition;
wherein said dynamically computed probability comprises a probability computed according to a nonlinear function characterized by a relation:

$$Pi = 100 - \left(\frac{sharedbusyports\% * \text{Arrival } j\%}{100}\right),$$

wherein Pi is the dynamic probability that the request can be filled and j is the percentage of arrival of a particular said class of video on demand request; and
fulfilling the at least first and second class video on demand requests allocated to the first, second and shared partitions.

2. The computer-implemented method for dynamic probability based admission control scheme for distributed video on demand system according to claim 1, wherein the subsequent incoming requests present an increasing load over time.

3. The computer-implemented method for dynamic probability based admission control scheme for distributed video on demand system according to claim 1, wherein a movie duration associated with said video on demand requests is of a fixed duration for all of said video on demand requests.

4. A system for implementing a dynamic probability based admission control scheme for distributed video on demand system in a communications network, consisting of:
means for accepting incoming video on demand requests as they arrive for classification thereof;
means for classifying the video on demand requests into at least first and second class video on demand requests;
wherein the first class requests are designated high priority, the second class requests are designated low priority;
means for partitioning system resources into a number of partitions equal to the number of classes of video on demand requests plus a shared partition;
means for allocating the first class video on demand requests to the first class partition if the first class partition is not full;
means for allocating the at least second class video on demand request to the second class partition if the second class partition is not full;
means for allocating new first class video on demand requests to the shared partition when the first class video on demand partition is full based upon a dynamically computed probability of subsequent incoming requests being filled by the shared partition;
means for allocating new second class video on demand requests to the shared partition when the second class video on demand partition is full based upon a dynamically computed probability of the new requests being filled by the shared partition;
wherein said dynamically computed probability comprises a probability computed according to a nonlinear function characterized by a relation:

$$Pi = 100 - \left(\frac{sharedbusyports\% * \text{Arrival } j\%}{100}\right),$$

wherein Pi is the dynamic probability that the request can be filled and j is the percentage of arrival of a particular said class of video on demand request; and
means for fulfilling the at least first and second class video on demand requests allocated to the first, second and shared partitions.

5. A computer software product, comprising a non-transitory medium readable by a processor, the medium having stored thereon a set of instructions for establishing a dynamic probability based admission control scheme for distributed video on demand system, the set of instructions including:
(a) a first sequence of instructions which, when executed by the processor, causes said processor to accept incoming video on demand requests as they arrive for classification thereof;

(b) a second sequence of instructions which, when executed by the processor, causes said processor to classify said video on demand requests into at least first and second class video on demand requests, wherein the first class requests are designated high priority, and the second class requests are designated low priority;

(c) a third sequence of instructions which, when executed by the processor, causes said processor to partition system resources into a number of partitions equal to the number of classes of video on demand requests plus a shared partition;

(c) a fourth sequence of instructions which, when executed by the processor, causes said processor to allocate the first class video on demand request to the first class partition if the first class partition is not full;

(d) a fifth sequence of instructions which, when executed by the processor, causes said processor to allocate the second class video on demand request to the second class partition if the second class partition is not full;

(e) a sixth sequence of instructions which, when executed by the processor, causes said processor to allocate new first class video on demand requests to the shared partition when the first class video on demand partition is full based upon a dynamically computed probability of subsequent incoming requests being filled by the shared partition;

(f) a seventh sequence of instructions which, when executed by the processor, causes said processor to allocate new second class video on demand requests to the shared partition when the second class video on demand partition is full based upon a dynamically computed probability of the new requests being filled by the shared partition;

(g) an eighth sequence of instructions which, when executed by the processor, causes said processor to fulfill the at least first and second class video on demand requests stored in the first, second and shared partitions; and (h) a ninth sequence of instructions which, when executed by the processor, causes said processor to dynamically compute the probability of a video on demand request being filled by the shared partition according to a nonlinear function;

wherein said nonlinear function being characterized by a relation:

$$Pi = 100 - \left(\frac{sharedbusyports\% * \text{Arrival } j\%}{100}\right);$$

where Pi is the dynamic probability that the request can be filled, and j is the percentage of arrival of a particular class of the video on demand request.

6. The computer software product according to claim 5, further comprising another sequence of instructions which, when executed by the processor, causes said processor to allow for the subsequent incoming requests to present an increasing load over time.

7. The computer software product according to claim 5, further comprising another sequence of instructions which, when executed by the processor, causes said processor to allow for a movie duration associated with said video on demand requests to be of a fixed duration for all of said video on demand requests.

\* \* \* \* \*